US008810656B2

(12) United States Patent
Keller et al.

(10) Patent No.: US 8,810,656 B2
(45) Date of Patent: Aug. 19, 2014

(54) SYSTEM AND METHOD FOR DETECTING MOTION AND PROVIDING AN AUDIBLE MESSAGE OR RESPONSE

(75) Inventors: Todd I. Keller, Merrick, NY (US); Peter John Botelho, East Setauket, NY (US)

(73) Assignee: Speco Technologies, Amityville, NY (US)

( * ) Notice: Subject to any disclaimer, the term of this patent is extended or adjusted under 35 U.S.C. 154(b) by 1491 days.

(21) Appl. No.: 11/690,626

(22) Filed: Mar. 23, 2007

(65) Prior Publication Data

US 2008/0231705 A1 Sep. 25, 2008

(51) Int. Cl.
*H04N 7/18* (2006.01)

(52) U.S. Cl.
USPC ............ 348/154; 348/152; 348/153; 348/155

(58) Field of Classification Search
USPC .................................. 348/152, 153, 154, 155
See application file for complete search history.

(56) References Cited

U.S. PATENT DOCUMENTS 4,441,100 A * 4/1984 Galloway ...................... 340/518
5,019,822 A * 5/1991 Kirkland ......................... 342/22
5,396,284 A * 3/1995 Freeman ....................... 348/154
5,625,572 A * 4/1997 Yonekura et al. ............. 702/183
5,731,832 A * 3/1998 Ng ................................ 348/155
6,323,897 B1 11/2001 Kogane et al. ................ 348/159
6,532,690 B1 * 3/2003 Vachette et al. ................ 40/454
6,970,183 B1 * 11/2005 Monroe ........................ 348/143
7,028,328 B2 4/2006 Kogane et al. ................ 725/105
7,034,679 B2 4/2006 Flynn ............................ 340/540
7,113,091 B2 * 9/2006 Script et al. ................... 340/546
7,187,279 B2 * 3/2007 Chung .......................... 340/541
7,310,111 B2 * 12/2007 Ramirez-Diaz et al. ...... 348/159
7,486,325 B2 * 2/2009 Kondo et al. ................. 348/335

(Continued)

OTHER PUBLICATIONS http://www.qstartech.com/main.html, Q-Star Products, Apr. 19, 2007, Description of the Flash Cam 880.

(Continued)

*Primary Examiner* — Jimmy H Tran
(74) *Attorney, Agent, or Firm* — Stroock & Stroock & Lavan LLP

(57) ABSTRACT

The present invention is to provide a system and method for monitoring a location that may include detecting motion in an area and providing an audible message in the area where motion is detected. The system may include a central processing unit (CPU), one or more video cameras coupled to the CPU, each camera monitoring an area and transmitting a video signal of the area to the CPU, and one or more audio output devices (AODs) coupled to the CPU, each AOD capable of producing an output and providing the output to at least one of the areas. A system may be provided in which the CPU is programmed to analyze the video signals from the video cameras to detect whether there is motion in one or more of the areas and transmits an audio file to the AODs producing an output to the one or more areas in which motion is detected. A method according the present invention includes the steps of monitoring at least one area using one or more video cameras, transmitting one or more video signals of the at least one area from each of the video cameras to a central processing unit (CPU); detecting motion in the at least one area; and transmitting an audio file over one or more AODs in the at least one area when motion is detected in the at least one area.

38 Claims, 3 Drawing Sheets

(56) References Cited

U.S. PATENT DOCUMENTS

| | | | | |
|---|---|---|---|---|
| 7,612,666 | B2 * | 11/2009 | Badawy | 340/541 |
| 7,940,432 | B2 * | 5/2011 | Shih et al. | 358/474 |
| 2002/0003575 | A1 * | 1/2002 | Marchese | 348/231 |
| 2003/0020808 | A1 * | 1/2003 | Luke et al. | 348/47 |
| 2003/0085998 | A1 * | 5/2003 | Ramirez-Diaz et al. | 348/143 |
| 2003/0115096 | A1 * | 6/2003 | Reynolds et al. | 705/14 |
| 2004/0080615 | A1 * | 4/2004 | Klein et al. | 348/143 |
| 2004/0103028 | A1 * | 5/2004 | Littman et al. | 705/14 |
| 2004/0196369 | A1 * | 10/2004 | Fukasawa et al. | 348/155 |
| 2005/0177769 | A1 * | 8/2005 | Stephen-Daly et al. | 714/14 |
| 2006/0024020 | A1 * | 2/2006 | Badawy | 386/46 |
| 2006/0053459 | A1 * | 3/2006 | Simerly et al. | 725/105 |
| 2006/0215030 | A1 * | 9/2006 | Shih et al. | 348/155 |
| 2007/0047641 | A1 * | 3/2007 | Bellinson et al. | 375/240.01 |
| 2007/0103550 | A1 * | 5/2007 | Frank et al. | 348/154 |
| 2008/0042824 | A1 * | 2/2008 | Kates | 340/522 |
| 2008/0094202 | A1 * | 4/2008 | Martin | 340/506 |
| 2008/0136914 | A1 * | 6/2008 | Carlson et al. | 348/155 |
| 2008/0201208 | A1 * | 8/2008 | Tie et al. | 705/10 |

OTHER PUBLICATIONS http://www.qstartech.com/Products2.html, Q-Star Products, Apr. 19, 2007, Descriptions of Flash Cam 770 and Flash Cam 880.

http://www.wbaltv.com/print/5347261/detail.html, "Talking Cameras Baltimore-Bound: City Hopes to Deter Vandalism, Illegal Dumping," Nov. 17, 2005.

* cited by examiner

SYSTEM AND METHOD FOR DETECTING MOTION AND PROVIDING AN AUDIBLE MESSAGE OR RESPONSE

BACKGROUND OF THE INVENTION

The present invention relates to a camera system and method for providing an audible message or response to individuals that are in the visual range of a video camera.

It is known in the art to monitor areas such as homes, stores and parking lots using a video camera system to deter theft. In such systems, a video camera monitors an area and may transmit video to a digital video recorder (DVR). The DVR may be configured to record the video transmitted by the video camera. In addition, the DVR may be configured to detect motion in the area that is under surveillance. However, there does not currently exist a camera system that provides audible messages to the individuals in the area under surveillance. It is the object of the present invention to provide such a system and method.

SUMMARY OF THE INVENTION

The object of the present invention is to provide a system and method for detecting motion in an area and providing an audible message in the area where motion is detected. The present invention is a system and method for monitoring a location such as a store, home or parking lot for motion. One or more cameras may monitor the location, and each camera may monitor distinct areas within the location or overlapping areas within the location. When motion is detected in an area monitored by a camera, an audible message is transmitted to an audio output device (AOD) such as a speaker or a siren located within the area. In the case where there is an interest in preventing theft, the audible message may be a warning that the area is under surveillance. In the case where there is an interest in promoting the purchase of certain goods, the audible message may be information about a product located in the area.

The system may include a central processing unit (CPU), one or more video cameras coupled to the CPU, each camera monitoring an area and transmitting a video signal of the area to the CPU, and one or more AODs coupled to the CPU, each AOD producing an output and providing the output to at least one of the areas. The CPU may be programmed to analyze the video signals from the video cameras to detect whether there is motion in one or more of the areas and transmits an audio file to the AODs producing an output to the one or more areas in which motion is detected. The audio file may be transmitted automatically to the AODs.

In the preferred embodiment, the CPU is a digital video recorder. In another embodiment, the CPU is a personal computer. In yet another embodiment, each camera has an internal CPU. Preferably, the CPU detects motion by analyzing the pixels of the video signals of the video cameras for changes. The CPU may be programmed to store the video signals of the video cameras continuously (24 hours a day, 7 days a week), when motion is detected in a monitored area, or in accordance with a schedule such as business hours, weekdays during business or operating hours, or 24 hours a day on weekend days. The schedule may be programmed in the CPU. The video signal may be stored in random access memory (RAM), read only memory (ROM), floppy disks, compact discs, tapes or any other suitable storage means.

In the preferred embodiment, an amplifier is located between the CPU and each AOD to amplify an audio file transmitted to each AOD that outputs in the area where motion has been detected. The audio file is preferably a .wav file. In the preferred embodiment, the audio file is a warning that the monitored area is under camera surveillance or a targeted marketing message about a product on display or located in the monitored area.

In the preferred embodiment, the CPU has an AOD and broadcasts a second audio file over the AOD when the CPU detects that there is a motion in one of the monitored areas. Preferably, the second audio file is a .wav file that is a tone or a message that motion has been detected in one of the monitored areas.

In one embodiment, in response to the detection of motion, the CPU energizes a visual display device, such as a light, a strobe light, a flashing light, a monitor, or any other suitable visual display means. In the preferred embodiment, the CPU energizes a strobe light, located in the area where motion is detected.

A method of detecting motion in an area and providing an audible message to the area may include the steps of: monitoring at least one area using one or more video cameras, transmitting one or more video signals of the at least one area from each of the video cameras to a central processing unit (CPU); detecting motion in the at least one area using the video signals; and transmitting an audio file over one or more AODs in the at least one area when motion is detected in the at least one area. In the preferred embodiment, the step of detecting motion is performed by analyzing the pixels of the video signals for changes.

The system may further include the step of storing the video signal from each video camera continuously (24 hours a day, 7 days a week), when motion is detected in any of the monitored areas, or according to a schedule, such as business hours, weekdays during business or operating hours, or 24 hours a day on weekend days. The schedule may be programmed in the CPU. The method may also include the step of outputting a second audio file over a second AOD when motion is detected in at least one area, the second AOD being part of the CPU. The method also may include the step of energizing a visual display device located in the at least one area when motion is detected in the at least one area.

BRIEF DESCRIPTION OF THE INVENTION

DETAILED DESCRIPTION OF THE INVENTION

Figure 1:
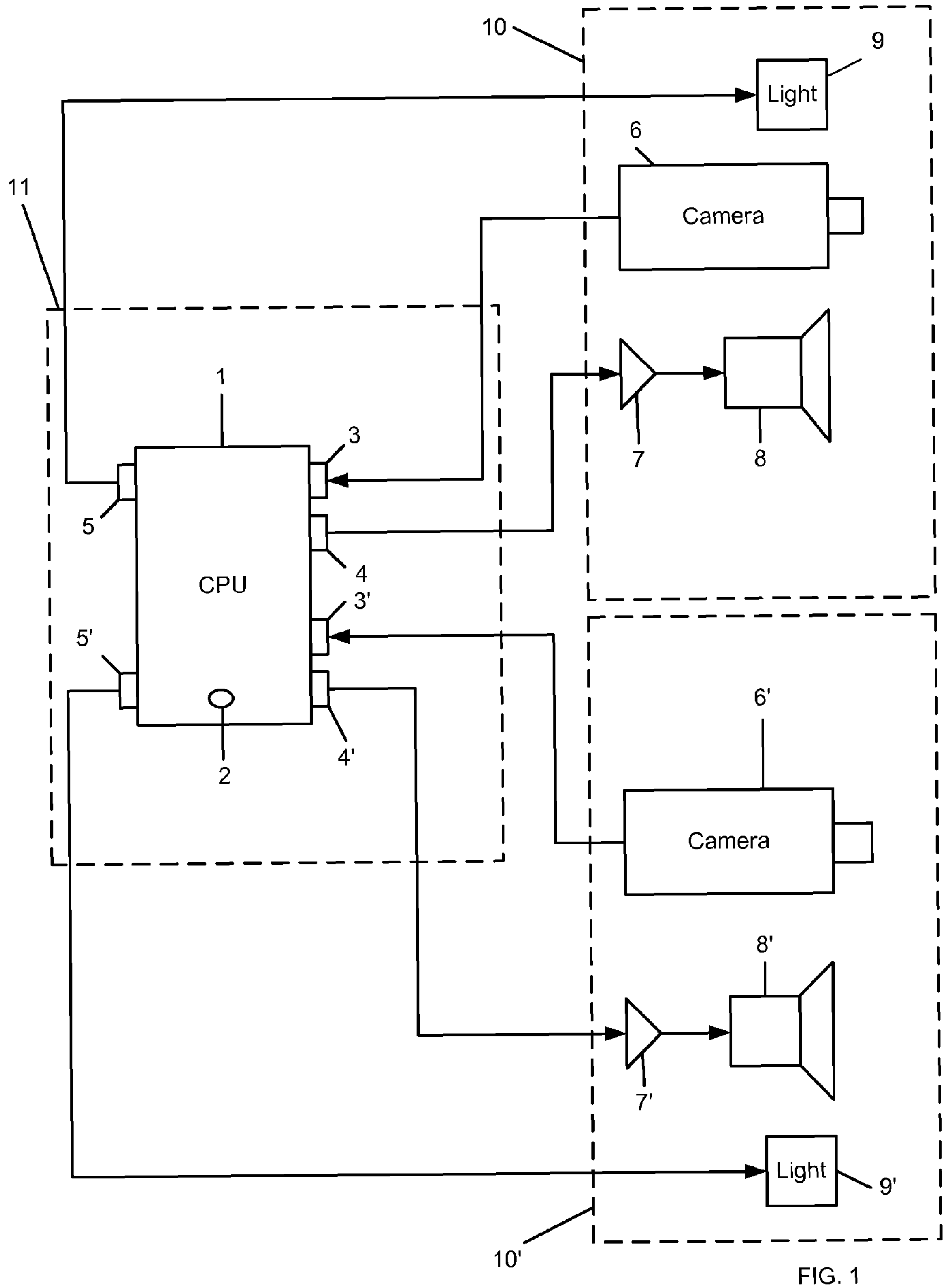
FIG. 1 is a block diagram of a system according to the present invention.

FIG. 1 shows an embodiment of the monitoring system that includes a central processing unit (CPU) 1, video cameras 6, 6' amplifiers 7, 7', speakers 8, 8' and optional lights 9, 9'. CPU 1 has a speaker 2, video inputs 3, 3', audio outputs 4, 4', and relay outputs 5, 5'. Video input 3 of CPU 1 is coupled to video camera 6. Video camera 6 is preferably a digital video camera. Audio output 4 of CPU 1 is coupled to amplifier 7 that is coupled to speaker 8. Relay output 5 of CPU 1 is coupled to light 9. Similarly, video input 3' of CPU 1 is coupled to video camera 6'. Audio output 4' of CPU 1 is coupled to amplifier 7' that is coupled to speaker 8'. Relay output 5' of CPU 1 is coupled to light 9'. Relay outputs 5, 5' may be used to provide power to an external device.

In the embodiment of FIG. 1, video camera 6, speaker 8, and light 9 are located in the proximity of a first area 10 to be monitored by video camera 6; video camera 6', speaker 8', and light 9' are located in the proximity of a second area 10' to be monitored by video camera 6'; CPU 1 is located remotely in a security area 11; amplifier 7 is located at some point between CPU 1 and speaker 8, and amplifier 7' is located at some point between the CPU 1 and the speaker 8'. Although amplifier 7 is depicted as located in area 10, and amplifier 7' is depicted as located in are 10', amplifiers 7, 7' may be located outside the areas 10, 10'.

In operation, CPU 1 receives video signals of areas 10, 10' via video inputs 3, 3' from video cameras 6, 6'. CPU 1 analyzes the video signals transmitted by video cameras 6, 6' for motion in areas 10, 10'. The CPU 1 detects motion in areas 10, 10' by monitoring the video transmitted by video cameras 6, 6' for changes in the pixels of the video signals. CPU 1 may be configured to store the video signals transmitted from video cameras 6, 6' continuously, according to a programmed schedule, and/or when motion or movement is detected. The video signals may be stored in RAM, ROM, a floppy disk, a CD-ROM, tapes or any other storage means. On detection of motion or movement in area 10 or area 10', CPU 1 transmits an audible alert via its speaker 2 to security area 11 and/or an audible message to the amplifier and speaker in the proximity of the area where motion was defected. If motion or movement is detected in area 10, then the audible message is transmitted via audio output 4 and amplifier 7 to speaker 8, and CPU 1 may also energize light 9 via relay output 5. If motion or movement is detected in area 10', then the audible message is transmitted via audio output 4' and amplifier 7' to speaker 8', and CPU 1 may also energize light 9' via relay output 5'. Thus, an individual present in areas 10, 10' may receive a visual alert via light 9, 9' and an audible message via speakers 8, 8.'

The audible alert of speaker 2 may include a tone or an announcement that motion has been detected in a monitored area. The audible message transmitted to speakers 9, 9' may include a warning that video cameras 6, 6' are transmitting and/or recording the monitored area, or a targeted message based on the product displayed in the monitored area 10, 10'. One skilled in the art will appreciate that the audible message may be transmitted to speakers 8, 8', while an audio alert is not transmitted to speaker 2, and vice versa.

The audible alert and audible message that may be transmitted to speaker 2, and amplifiers 7, 7' and speakers 8, 8' may be in the format of an audio digital file, such as WavForm (WAV), Audio Interchange File Format (AIFF), Au file format (AU), Free Lossless Audio Codec (FLAC), Monkey's Audio (APE), WavPack (WV), Shorten (SHN), True Audio (TTA), Apple Lossless (M4A), Windows Media Audio (WMA), MPEG-1 Audio Layer 3 (MP3), Vorbis (OGG), and/or Advanced Audio Coding (ACC).

The criteria for selecting the audible message transmitted to amplifiers 7, 7' and speakers 8, 8' may include the time of day, the date, the location of the area to be monitored. For example, in one embodiment implemented in a parking lot, it may only be necessary to monitor the parking lot at night. Therefore, motion detected during the day in the parking lot would not trigger an audible alert or an audible message during the day. In another example, in an embodiment implemented in a store, motion detected during the day may trigger an audible message with information regarding products on display in the monitored area; while motion during the night or on Sunday might trigger a message that the area is under surveillance to discourage theft.

Figure 2:
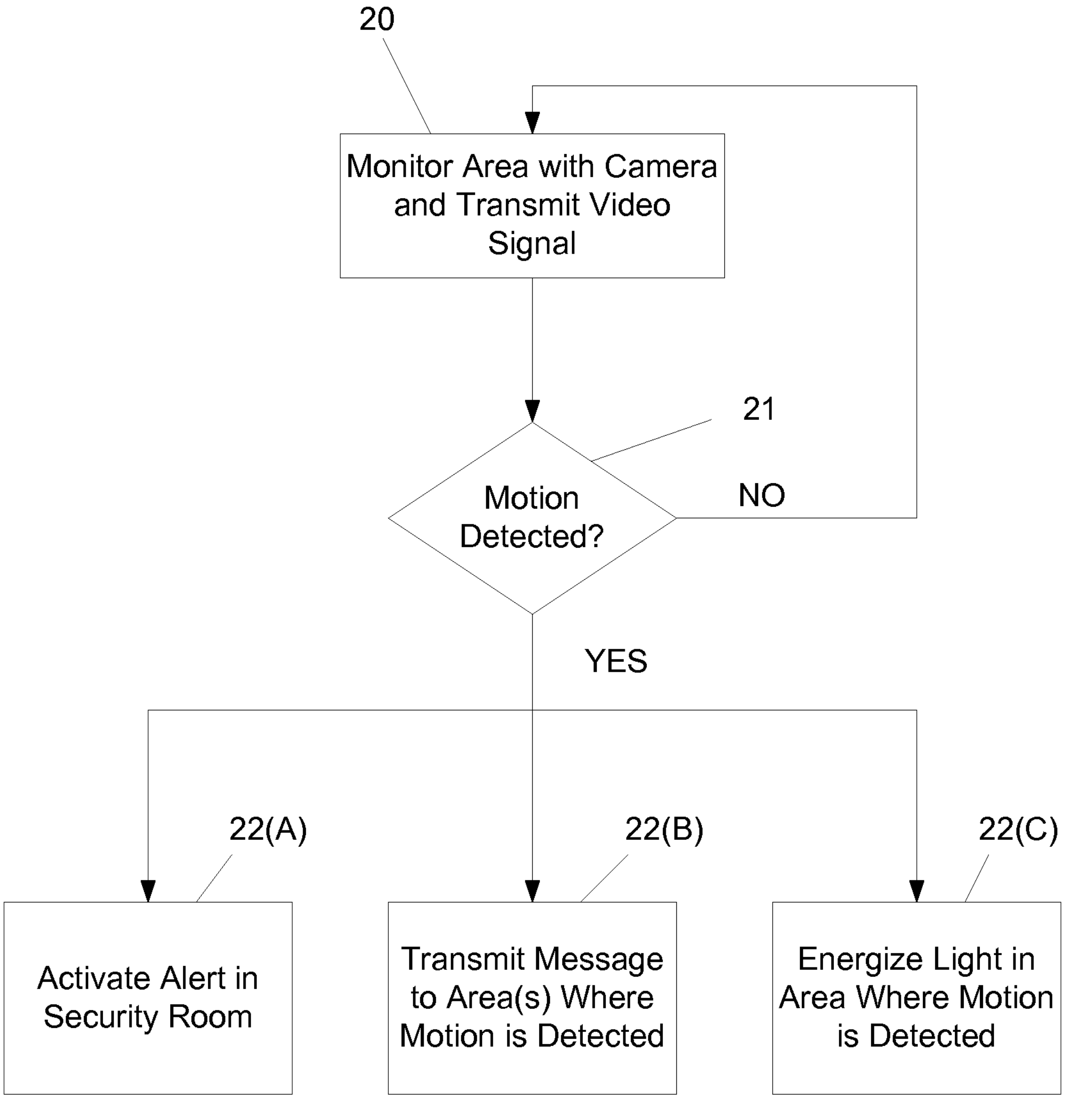
FIG. 2 is a flow chart of a method according to the present invention.

FIG. 2 shows a flow chart of an embodiment of a method of monitoring and/or detecting motion in an area and providing an audible message to the area. In step 20, video cameras, preferably digital video cameras, monitor areas and transmit video in the form of digital signals of the monitored areas to a CPU. In step 21, the video signals are analyzed for motion by analyzing the video signals for changes in the pixels. If the CPU detects motion in any of the areas monitored, then any or all of steps 22(A), 22(B), and 22(C) are performed. In step 22(A) the CPU triggers and provides an output that may activate an audio alert in a security area to notify security personnel that there is motion in a monitored area. In step 22(B), the CPU transmits an audio message to the audio output device(s) in the area(s) where motion is detected. The message may be a warning that the monitored area is under surveillance, or the message may be a message about product on display in a monitored area. The audible message preferably is in the form of an audio digital file. In step 22(C), the CPU activates a light in the monitored area.

Figure 3:
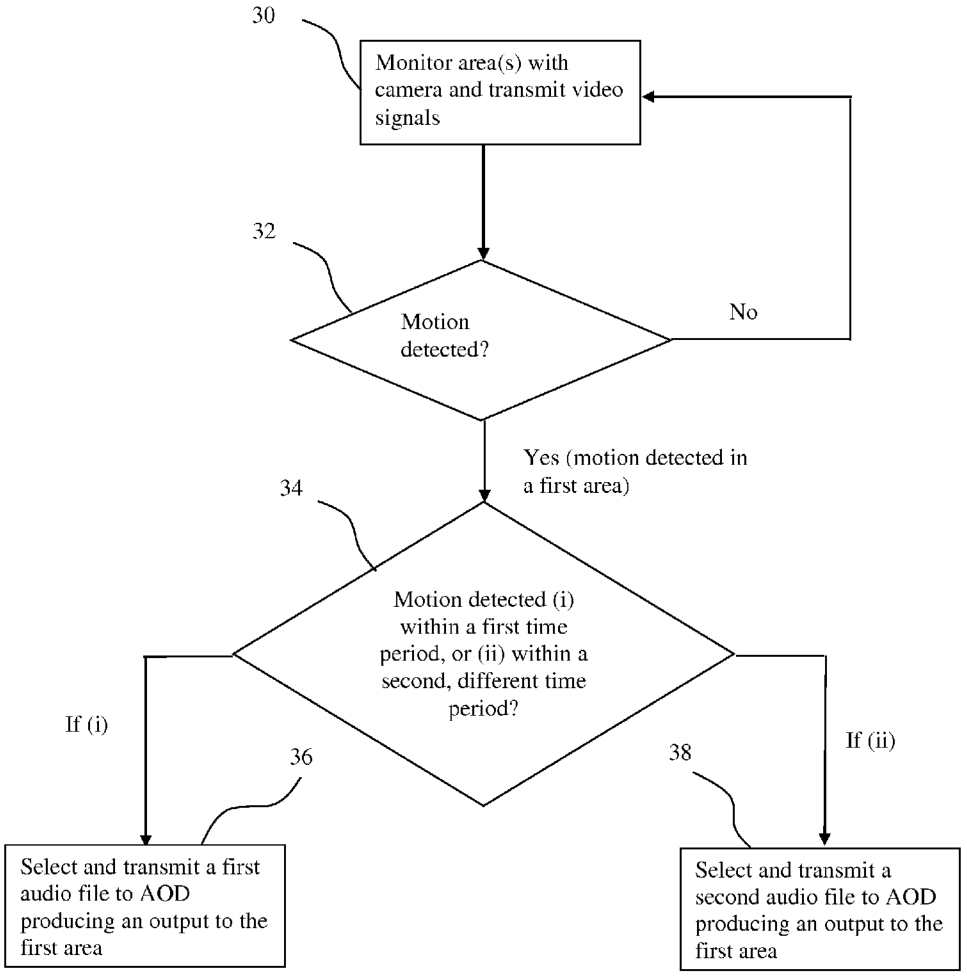
FIG. 3 is a flow chart of a method according to the present invention.

FIG. 3 shows a flow chart of another embodiment of the method of monitoring and detecting motion in an area and providing an audible message to the area. At step 30, a video camera(s) monitors one or more areas and transmit video signals to a CPU. In step 32, the video signals are analyzed by the CPU to detect motion in the area(s). In step 34, when motion is detected in a first area, and in response to such a detection, the CPU determines whether the motion is detected within a first time period or a second, different time period. In step 36, if the CPU determines that the motion is detected within the first time period, the CPU cause a first audio file to be sent to an AOD producing an output to the first area. In step 38, if the CPU determines that the motion is detected within the second time period, the CPU causes a second audio file to be sent to the AOD producing an output to the first area.

One skilled in the art would recognize that any number of cameras, CPUs, speakers, amplifiers and/or lights may be configured in the manner depicted in FIG. 1. One skilled in the art would further recognize that the CPU 1 may be configured to have any number of inputs and outputs. One skilled in the art would also recognize that in another embodiment, an area monitored by video cameras in accordance with the present invention may overlap with another monitored area, have more than one video camera within or monitoring the areas, and/or have more than one speaker within the area.

In the preferred embodiment of the present invention, the CPU is a digital video recorder. In another embodiment the CPU is a personal computer. In yet another embodiment, the CPU is not external to the video cameras, and each video camera has an internal CPU.

Although the present invention has been described and illustrated in detail, it is clearly understood that the same is by way of illustration and example only and is not to be taken by way of limitation, the spirit and scope of the present invention being defined only by the terms of the accompanying claims.

What is claimed is:

1. A system for detecting motion and providing an audible alert to a location being monitored by a video camera, the system comprising:

a central processing unit (CPU);

at least one video camera in communication with the CPU, each video camera monitoring an area and transmitting a video signal of the area to the CPU; and at least one audio output device (AOD) in communication with the CPU, each AOD producing an output and providing the output to at least one of the areas;

wherein the CPU is programmed to:

(a) analyze at least one of the video signals from the at least one video camera to detect whether there is motion in at least one of the areas and, (b) upon detecting motion in a first area of the at least one of the areas, and in response to the detected motion, determine whether the motion was detected within a first time period or within a second, different time period, and select and transmit at least one first audio file to the at least one AOD producing an output to the first area if the motion is detected within the first time period, and select and transmit at least one second audio file to the at least one AOD producing an output to the first area if the motion is detected within the second time period.

2. The system according to claim 1, wherein:

the CPU is at least one of a digital video recorder and a personal computer.

3. The system according to claim 1, wherein:

the CPU detects motion by analyzing pixels of the video signal of the at least one video camera for changes.

4. The system according to claim 1, wherein:

the CPU is programmed to store in memory the video signal of the at least one video camera.

5. The system according to claim 4, wherein:

the at least one video is stored in memory at least one of continuously, when motion is detected in an area, and according to a schedule.

6. The system according to claim 1, wherein the system comprises:

a plurality of video cameras; and each video camera monitors an area that does not overlap with the area monitored by any other video camera.

7. The system according to claim 1, wherein:

the at least one AOD is at least one of a speaker and a siren, and the audio files are amplified prior to being transmitted to the AOD.

8. The system according to claim 1, wherein:

the at least one first audio file comprises a warning message that the area is under camera surveillance.

9. The system according to claim 1, wherein:

the at least one second audio file comprises a message about at least one product on display in the area.

10. The system according to claim 1, wherein:

the CPU includes a second AOD; and the CPU is programmed to output a third audio file via the second AOD when the CPU detects that there is motion in at least one of the areas.

11. The system according to claim 10, wherein:

the third audio file is at least one of a tone and a message that motion has been detected in the area.

12. The system according to claim 1, wherein:

the CPU is programmed to energize a visual display device in at least one of the areas when the CPU detects motion in at least one of the areas.

13. The system according to claim 12, wherein:

the visual display device is at least one of a light, a strobe light, a flashing light and a monitor.

14. A system for detecting motion and providing an audible alert to a location being monitored by a video camera, the system comprising:

at least one video camera, each video camera having an internal central processing unit (CPU), each of the cameras monitoring an area and producing a video signal of the area;

at least one audio output device (AOD) in communication with a corresponding one of the at least one video camera, each AOD capable of producing an output and providing the output to the area monitored by the corresponding one of the at least one video camera;

wherein the CPU is programmed to:

(a) analyze at least one of the video signals to detect whether there is motion in at least one of the areas and, (b) upon detecting motion in a first area of the at least one of the areas, and in response to the detected motion, determine whether the motion was detected within a first time period or within a second, different time period, and select and transmit at least one first audio file to the at least one AOD producing an output to the first area if the motion is detected within the first time period, and select and transmit at least one second audio file to the at least one AOD producing an output to the first area if the motion is detected within the second time period.

15. The system according to claim 14, wherein:

the CPU detects motion by analyzing pixels of at least one of the video signals for changes.

16. The system according to claim 14, wherein:

the CPU is programmed to store in memory at least one of the video signals.

17. The system according to claim 16, wherein:

the at least one video is stored in memory at least one of continuously, when motion is detected in an area, and according to a schedule.

18. The system according to claim 14, wherein the system comprises:

a plurality of video cameras; and each video camera monitors an area that does not overlap with the area monitored by any other video camera.

19. The system according to claim 14, wherein:

the at least one AOD is at least one of a speaker and a siren, and the audio files are amplified prior to being transmitted to the AOD.

20. The system according to claim 14, wherein:

the at least one first audio file comprises a warning message that the area is under camera surveillance.

21. The system according to claim 14, wherein:

the at least one second audio file comprises a message about at least one product on display in the area.

22. The system according to claim 14, wherein:

each camera has an internal AOD; and the CPU is programmed to output a third audio file via the internal AOD when the CPU detects that there is motion in at least one of the areas monitored by at least one of the video cameras.

23. The system according to claim 22, wherein:

the third audio file is at least one of a tone and a message that motion has been detected in the area.

24. The system according to claim 14, wherein:

the CPU is programmed to energize a visual display device in at least one of the areas when the CPU detects motion in at least one of the areas.

25. The system according to claim 24, wherein:

the visual display device is at least one of a light, a strobe light, a flashing light, and a monitor.

26. A method of monitoring a location and providing an audible alert, comprising the at least one of sequential, non-sequential and sequence independent steps of:

monitoring at least one area using one or more video cameras;

transmitting at least one video signal of the at least one area to a central processing unit (CPU);

providing at least one audio output device (AOD) in the at least one area;

detecting motion in the at least one area;

upon detecting motion in the at least one area, and in response to the detected motion, determining, by the CPU, whether the motion was detected within a first time period or within a second, different time period;

selecting and outputting at least one first audio file over the at least one AOD to the at least one area when the motion is detected in the at least one within the first time period; and selecting and outputting at least one second audio file over the at least one AOD to the at least one area when the motion is detected in the at least one area within the second time period.

27. The method according to claim 26, wherein:

the CPU is at least one of a digital video recorder and a personal computer.

28. The method according to claim 26, wherein:

the CPU is located inside the video cameras.

29. The method according to claim 26, wherein:

the at least one AOD is at least one of a speaker and a siren, and further comprising the step of amplifying the audio files prior to the audio files being transmitted to the AOD.

30. The method according to claim 26, wherein:

the step of detecting motion is performed by analyzing pixels of the at least one video signal for changes.

31. The method according to claim 26, further comprising:

storing at least one of the video signals in memory.

32. The method according to claim 31, wherein:

the at least one video is stored in memory at least one of continuously, when motion is detected in an area, and according to a schedule.

33. The method according to claim 26, wherein:

the at least one first audio file comprises a warning message that the at least one area is under camera surveillance.

34. The method according to claim 26, wherein:

the at least one second audio file comprises a message about at least one product on display in the at least one area.

35. The method according to claim 26, further comprising:

providing a second AOD that is housed with the CPU; and outputting a third audio file via the second AOD when motion is detected in the at least one area.

36. The method according to claim 35, wherein:

the third audio file is at least one of a tone and a message that motion has been detected in the area.

37. The method according to claim 26, further comprising:

providing a light visible in the at least one area; and energizing a visual display device located in the at least one area when motion is detected in the at least one area.

38. The method according to claim 37, wherein:

the visual display device is at least one of a light, a strobe light, a flashing light, and a monitor.

* * * * *